United States Patent
Armstrong et al.

(10) Patent No.: US 9,925,560 B2
(45) Date of Patent: *Mar. 27, 2018

(54) CROSSLINKED POLY(VINYL ALCOHOL) AND SILICA NANOPARTICLE MULTILAYER COATINGS AND METHODS

(71) Applicant: 3M INNOVATIVE PROPERTIES COMPANY, St. Paul, MN (US)

(72) Inventors: Paul B. Armstrong, Minneapolis, MN (US); Justin A. Riddle, St. Paul, MN (US); Karan Jindal, Woodbury, MN (US); Samuel J. Carpenter, St. Paul, MN (US); Garry W. Lachmansingh, Plymouth, MN (US); William R. Dudley, Sebring, FL (US); Jason T. Petrin, Woodbury, MN (US); Naiyong Jing, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 126 days.

This patent is subject to a terminal disclaimer.

(21) Appl. No.: 14/893,248

(22) PCT Filed: Apr. 25, 2014

(86) PCT No.: PCT/US2014/035450
§ 371 (c)(1),
(2) Date: Nov. 23, 2015

(87) PCT Pub. No.: WO2014/193573
PCT Pub. Date: Dec. 4, 2014

(65) Prior Publication Data
US 2016/0121365 A1    May 5, 2016

Related U.S. Application Data

(60) Provisional application No. 61/828,836, filed on May 30, 2013.

(51) Int. Cl.
*B05D 7/00* (2006.01)
*C09D 129/04* (2006.01)
(Continued)

(52) U.S. Cl.
CPC .............. *B05D 7/50* (2013.01); *B05D 7/54* (2013.01); *C03C 17/42* (2013.01); *C08J 7/045* (2013.01);
(Continued)

(58) Field of Classification Search
CPC ...... C08J 7/045; C09D 5/1618; C09D 129/04; C09D 5/1693
See application file for complete search history.

(56) References Cited

U.S. PATENT DOCUMENTS

| | | |
|---|---|---|
| 2,761,419 A | 9/1956 | Mercier |
| 3,692,725 A | 9/1972 | Duchane |

(Continued)

FOREIGN PATENT DOCUMENTS

| | | |
|---|---|---|
| CN | 101579672 | 11/2009 |
| EP | 0 437 902 | 7/1991 |

(Continued)

OTHER PUBLICATIONS

U.S. Appl. No. 14/893,232, "Poly(Vinyl Alcohol) and Silica Nanoparticle Multilayer Coatings and Methods," filed Nov. 23, 2015 (WO 2014/193572).

(Continued)

*Primary Examiner* — Hai Vo
(74) *Attorney, Agent, or Firm* — Adrian L. Pishko

(57) ABSTRACT

Articles having crosslinked poly(vinyl alcohol) (PVA) and silica nanoparticle multilayer coatings are provided. More specifically, articles including a substrate, and a multilayer coating attached to the substrate are provided. The multilayer coating includes a first crosslinked poly(vinyl alcohol)

(Continued)

20nm (PVA) layer and a first silica layer. The first crosslinked PVA layer is an outermost layer of the multilayer coating. The first silica layer comprises a plurality of acid-sintered interconnected silica nanoparticles arranged to form a continuous three-dimensional porous network. The PVA and silica nanoparticle multilayer coatings can be used on a large variety of substrates and tend to be resistant to wet and dry abrasions, scratches, and impacts.

18 Claims, 2 Drawing Sheets

(51) Int. Cl.
　　　*C09D 1/00*　　(2006.01)
　　　*C08J 7/04*　　(2006.01)
　　　*C09D 5/16*　　(2006.01)
　　　*C03C 17/42*　　(2006.01)
(52) U.S. Cl.
　　　CPC .......... *C09D 1/00* (2013.01); *C09D 5/1618* (2013.01); *C09D 5/1693* (2013.01); *C09D 129/04* (2013.01); *B05D 2201/02* (2013.01); *B05D 2507/00* (2013.01); *B05D 2518/10* (2013.01); *C03C 2217/478* (2013.01)

(56) References Cited

U.S. PATENT DOCUMENTS

| | | | |
|---|---|---|---|
| 4,127,682 A * | 11/1978 | Laurin | C03C 17/32 427/164 |
| 4,478,909 A * | 10/1984 | Taniguchi | B29D 11/00865 428/331 |
| 4,567,221 A | 1/1986 | Maruyama | |
| 4,758,547 A | 7/1988 | Itabashi | |
| 4,859,717 A | 8/1989 | Hoskin | |
| 5,134,021 A | 7/1992 | Hosono | |
| 5,147,344 A | 9/1992 | Sachau | |
| 5,221,497 A | 6/1993 | Watanabe | |
| 5,262,475 A * | 11/1993 | Creasy | C08J 3/246 427/163.1 |
| 5,677,050 A | 10/1997 | Bilkadi | |
| 6,007,874 A | 12/1999 | Bhave | |
| 6,040,053 A | 3/2000 | Scholz | |
| 6,432,516 B1 | 8/2002 | Terasaki | |
| 7,723,424 B2 | 5/2010 | Hashemzadeh | |
| 2003/0047111 A1 | 3/2003 | Niume | |
| 2008/0248287 A1 | 10/2008 | Illsley | |
| 2010/0035039 A1 * | 2/2010 | Jing | C08J 7/04 428/304.4 |
| 2010/0062117 A1 | 3/2010 | Illsley | |
| 2011/0033694 A1 | 2/2011 | Jing | |
| 2012/0028005 A1 | 2/2012 | Zheng | |
| 2013/0224478 A1 | 8/2013 | Jing | |
| 2016/0096969 A1 * | 4/2016 | Jindal | C08J 7/045 428/312.6 |

FOREIGN PATENT DOCUMENTS

| | | |
|---|---|---|
| EP | 0662102 | 7/1995 |
| EP | 0770658 | 5/1997 |
| WO | WO 2009-140482 | 11/2009 |
| WO | WO 2010-114698 | 10/2010 |
| WO | WO 2010-114700 | 10/2010 |
| WO | WO 2011-084661 | 7/2011 |
| WO | WO 2011-137005 | 11/2011 |
| WO | WO 2011-139573 | 11/2011 |
| WO | WO 2012-047422 | 4/2012 |
| WO | WO 2012-064646 | 5/2012 |
| WO | WO 2012-173803 | 12/2012 |
| WO | WO 2014-193571 | 12/2014 |
| WO | WO 2014-193572 | 12/2014 |

OTHER PUBLICATIONS

U.S. Appl. No. 14/893,262, "Poly(Vinyl Alcohol)-Containing and Silica Nanoparticle Multilayer Coatings and Methods," filed Nov. 23, 2015 (WO 2014/193571).

Martens, "Characterization of hydrogels formed from acrylate modified poly(vinyl alcohol) macromers", Polymer, 2000, vol. 41, No. 21, pp. 7715-7722.

Uragami, "Studies on Syntheses and Permeabilities of Special Polymer Membranes", Die Angewandte Makromolekulare Chemie, 1986, vol. 138, pp. 173-183.

Bragg, "The Form Birefringence of Macromolecules", Acta Crystallographica, 1953, vol. 6, pp. 865-867.

International Search report for PCT International Application No. PCT/US2014/035450 dated Jul. 7, 2014, 4 pages.

* cited by examiner

20nm

20nm

CROSSLINKED POLY(VINYL ALCOHOL) AND SILICA NANOPARTICLE MULTILAYER COATINGS AND METHODS

CROSS REFERENCE TO RELATED APPLICATIONS

This application is a national stage filing under 35 U.S.C. 371 of PCT/US2014/035450, filed Apr. 25, 2014, which claims priority to U.S. Application No. 61/828,836, filed May 30, 2013, the disclosure of which is incorporated by reference in its/their entirety herein.

FIELD

Articles and methods of making articles having crosslinked poly(vinyl alcohol) and silica nanoparticle multilayer coatings are provided.

BACKGROUND

Acid-sintered nanosilica coatings have been prepared by acidifying an aqueous colloidal suspension of nanometer-scale particles to a pH of less than 5, for example 2-3. Such silica nanoparticle coatings include those, for example, described in co-owned U.S. Patent Application Publication Nos. 2011/0033694 (Jing et al.) and 2010/0035039 (Jing et al.) and in co-owned International Application Publication Nos. WO 2012/064646 (Riddle et al.), WO 2011/139573 (Pett et al.), and WO 2012/047422 (Hebrink et al.). At a pH of 2-3, the particles possess little or no net charge, and can thus aggregate and fuse. Upon drying, the particles sinter at temperatures much lower than would be required without acidification. The result is a hard, porous, and hydrophilic coating that can be applied to various substrates. Dry dirt and dust exhibits reduced adhesion to nanosilica-coated surfaces relative to common glass or polymeric substrates, plus the nanosilica-coated surfaces have anti-fogging and anti-soiling properties. While acid-sintered nanosilica coatings have been shown to be acceptably stable to moisture and UV light, they do not possess sufficient impact and/or abrasion resistance for some applications.

SUMMARY

Articles having a substrate and a multilayer coating attached to the substrate are provided. More specifically, the multilayer coating includes a first crosslinked poly(vinyl alcohol) (PVA) layer and a first silica layer. The first crosslinked PVA layer is an outermost layer of the multilayer coating. The silica layer comprises a plurality of acid-sintered interconnected silica nanoparticles arranged to form a continuous three-dimensional porous network. The multilayer coatings can be used on a large variety of substrates and tend to be resistant to wet and dry abrasions, scratches, and impacts.

In a first aspect, an article is provided that includes (a) a substrate and (b) a multilayer coating attached to the substrate. The multilayer coating includes (i) a first crosslinked poly(vinyl alcohol) (PVA) layer that is an outermost layer of the multilayer coating, and (ii) a first silica layer disposed between a surface of the substrate and the outermost crosslinked PVA layer. The first silica layer comprises a plurality of acid-sintered interconnected silica nanoparticles arranged to form a continuous three-dimensional porous network.

In a second aspect, a method of making an article is provided. The method includes (a) providing a substrate and (b) attaching a multilayer coating to the substrate. The attaching includes (i) forming a first crosslinked poly(vinyl alcohol) (PVA) layer that is an outermost layer of the multilayer coating, and (ii) forming a first silica layer disposed between a surface of the substrate and the outermost crosslinked PVA layer.

Figure 1A:
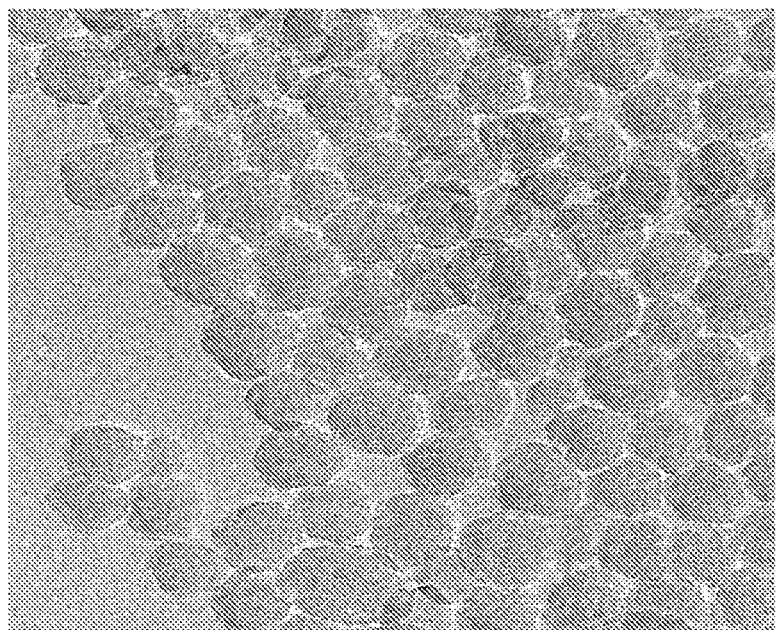
FIG. 1A is a transmission electron micrograph of a comparative example silica layer formed without acid-sintering of the silica nanoparticles.

While the above-identified drawings, which may not be drawn to scale, set forth various embodiments of the present disclosure, other embodiments are also contemplated, as noted in the Detailed Description.

DETAILED DESCRIPTION

Articles having a multilayer coating attached to a substrate are provided. More specifically, the articles include a substrate, a first crosslinked poly(vinyl alcohol) (PVA) layer that is the outermost layer of the multilayer coating and a first silica layer disposed between a surface of the substrate and the first crosslinked PVA layer. The first silica layer comprises a plurality of acid-sintered interconnected silica nanoparticles arranged to form a continuous three-dimensional porous network. The multilayer coatings can be used on a large variety of substrates and tend to be resistant to wet and dry abrasions, scratches, and impacts.

The recitation of any numerical range by endpoints is meant to include the endpoints of the range, all numbers within the range, and any narrower range within the stated range (e.g. 1 to 5 includes 1, 1.5, 2, 2.75, 3, 3.8, 4, and 5). Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that, as used herein:

The term "a", "an", and "the" are used interchangeably with "at least one" to mean one or more of the elements being described.

The term "and/or" means either or both. For example, the expression "A and/or B" means A, B, or a combination of A and B.

The term "coating composition" refers to a solution or dispersion including components (e.g., PVA, silica nanoparticles, solvent, additives, etc.) suitable for applying onto a major surface of a substrate as a coating, onto another coating composition present on a substrate, or onto a layer present on a substrate.

The term "layer" refers to a coating composition that has been applied onto a major surface of a substrate or onto another layer on a substrate, and refers to the components remaining after a drying process.

The term "fluid layer" refers to a coating composition that has been applied onto a surface, for example onto a major surface of a substrate or onto another fluid layer on a substrate, prior to being subjected to a drying process.

The term "outermost layer" refers to the uppermost layer of a multilayer coating, i.e., the layer furthest from a major surface of a substrate on which the multilayer coating is applied.

The term "PVA" refers to poly(vinyl alcohol), derivatives thereof, and mixtures of poly(vinyl alcohol) and its derivatives. The degree of hydrolysis of PVA or its derivatives is from 50 to 100 percent, or 70 to 100 percent, or 85 to 100 percent. For example, the PVA can include up to 50 percent polyvinyl acetate.

The term "PVA layer" refers to a layer comprising 50% by weight or more PVA.

The term "crosslinked PVA" refers to PVA that has been crosslinked by any suitable means, including the use of crosslinking agents.

The term "outermost layer" refers to the uppermost layer of a multilayer coating, i.e., the layer furthest from a major surface of a substrate on with the multilayer coating is applied.

The term "outermost crosslinked PVA layer" refers to the outermost layer of a multilayer coating comprising poly(vinyl alcohol) (PVA) and is used interchangeably with the term "first crosslinked PVA layer". A top crosslinked PVA layer comprises crosslinked PVA.

The term "acid-sintered silica nanoparticles" means silica nanoparticles that have been subjected to an acid having a pKa less than 3.5 to a pH, such that a dispersion of the silica nanoparticles has a pH in a range of 2 to 5. Typically, thermal sintering of silica requires temperatures of about 70% of the melting point temperature of about 1400-1700° C.; however, the acid-sintered silica nanoparticles are instead chemically sintered by the acid. Optionally, the acid-sintered silica nanoparticles are also exposed to temperatures as high as about 120° C. during drying/curing processes for a coated article.

The term "silica layer" refers to a layer comprising 75% by weight or more silica nanoparticles of the layer. The silica nanoparticles are preferably acid-sintered silica nanoparticles, however, the silica nanoparticles are not required to be acid-sintered.

The term "intermediary layer" refers to a layer of a multilayer coating that is located anywhere in the multilayer coating except for as the furthest layer from a major surface of a substrate, i.e., an intermediary layer is not a top (i.e., outermost) layer. Rather, an intermediary layer is disposed between a top layer and the substrate. In some embodiments an intermediary layer is located between a top layer and a layer attached to a major surface of the substrate, while in other embodiments an intermediary layer is attached to a major surface of the substrate as a bottom layer.

The term "bottom layer" refers to a layer of a multilayer coating that is attached to a major surface of a substrate. If a bottom layer is configured to assist in adhering another layer to a substrate, it is often referred to as a primer layer. A bottom layer that is acts as a primer preferably comprises acid-sintered silica nanoparticles. The first silica layer is often the bottom layer.

The term "adjacent" in reference to a first layer being adjacent to a substrate, means that the first layer can contact a surface of the substrate or can be separated from a surface of the substrate by one or more intermediary layers. Similarly, the term "adjacent" in reference to a first layer being adjacent to a second layer, means that the first layer can contact the second layer or can be separated from the second layer by one or more intermediary layers.

In a first aspect, an article is provided that includes (a) a substrate, and (b) a multilayer coating attached to the substrate. The multilayer coating includes (i) a first crosslinked poly(vinyl alcohol) (PVA) layer that is an outermost layer of the multilayer coating, and (ii) a first silica layer disposed between a surface of the substrate and the outermost crosslinked PVA layer. The first silica layer comprises a plurality of acid-sintered interconnected silica nanoparticles arranged to form a continuous three-dimensional porous network.

A multilayer coating on a major surface of an article comprises at least two layers: a first crosslinked PVA layer and a first silica layer. In some embodiments, a multilayer coating includes three layers, four layers, five layers, or six or more layers. Additionally, any other layer typically comprises PVA, silica nanoparticles, or a combination thereof. In any of these additional layers, the PVA can be crosslinked or not crosslinked. The silica in any of these additional layers contain silica nanoparticles that can, but that are not required to be, acid-sintered interconnected silica nanoparticles arranged to form a continuous three-dimensional porous network. In some embodiments, the top layer (i.e., outermost layer) comprises crosslinked PVA, the bottom layer adjacent to the substrate comprises acid-sintered silica nanoparticles, and each optional intermediary layer comprises silica nanoparticles, PVA, or a composite of silica nanoparticles and PVA.

It has been discovered that the presence of an outermost layer of crosslinked PVA (i.e., the first crosslinked PVA layer) improves the durability of articles having multilayer coatings relative to the same structure in which the PVA is not crosslinked, (or articles having only a first silica layer), for example as measured by pencil hardness testing, circular Taber abrasion testing and/or by falling sand testing. In particular, the outermost layer of crosslinked PVA provides resistance to both dry and wet abrasion. Without wishing to be bound by theory, it is believed that the presence of at least one layer comprising PVA improves the toughness of the coating due to the flexibility of PVA, which allows stress and strain to dissipate and thereby minimizes cracking of the multilayer coating. Further, the crosslinking of the PVA improves the resistance of the PVA to liquids, such as water. In some embodiments the coated article is more readily cleanable. By "cleanable" it is meant the coating composition, when cured, provides oil and soil resistance to help prevent the coated article from being soiled by exposure to contaminants such as oils or adventitious dirt. The multilayer coating can also make the coating easier to clean if it is soiled, so only a simple rinse in water is required to remove contaminants.

In some embodiments, multilayer coatings of the present invention impart anti-fog properties to substrates coated therewith. Coatings are considered anti-fogging if a coated substrate resists the formation of small, condensed water droplets in sufficient density to significantly reduce the transparency of the coated substrate such that it cannot be adequately seen through after exposure to repeated human breath directly on the article and/or after holding the article above a source of steam. A coating may still be regarded as anti-fogging even though a uniform water film or a small number of large water droplets forms on the coated substrate so long as the transparency of the coated substrate is not significantly reduced such that it cannot be readily seen through. In many instances, a film of water that does not significantly reduce the transparency of the substrate will remain after the substrate has been exposed to a steam source. There are numerous instances where the value of optically clear articles would be enhanced if the tendency of the articles to cause light scattering or glare or to be obscured by the formation of a fog on a surface of the article could be reduced. For example, architectural glazings, decorative glass frames, motor vehicle windows and windshields may all scatter light in a manner that causes an annoying and disruptive glare. Use of such articles may also be detrimentally affected by the formation of a moisture vapor fog on a surface of the article. Ideally, in preferred embodiments, the coated articles of this invention have exceptional anti-fog properties while also separately having greater than 90 percent transmission of 550 nm light. The polymeric substrates may comprise polymeric sheet, film, or molded material.

PVA is a polymer that is known and available commercially. Typically, PVA is prepared by hydrolyzing acetate groups to hydroxyl groups. PVA, silane-modified PVA, crosslinked PVA, and combinations thereof, are employed in embodiments of multilayer coatings of the present invention. Silane-modified PVA is believed to provide improved strength to the PVA, to enhance adhesion of the PVA to silica present in other layers of the multilayer coating, and/or to assist in crosslinking of the PVA. Suitable silane-modified polyvinyl alcohols include those known in the art, such as silane-modified PVA produced via treating vinyl alcohol polymers with one or more ethylenically unsaturated, silane-containing monomers at elevated temperature. See, for example, U.S. Pat. No. 7,723,424 (Hashemzadeh et al.). Alternatively, U.S. Pat. No. 4,567,221 (Maruyama et al.) discloses synthesizing a silylated PVA by copolymerizing vinyl acetate and vinyl alkoxy silanes, subsequently followed by hydrolyzing the acetate groups. Any suitable PVA may be employed, for example KURARAY R-2105, which is a trade designation for a silane modified polyvinyl alcohol polymer commercially available from Kuraray Co. LTD, Japan. Another suitable PVA is KURARAY PVA 235, which is a trade designation for a polyvinyl alcohol polymer that is also commercially available from Kuraray Co. LTD, Japan. Suitable PVA polymers often comprise a molecular weight between about 16,000 and 200,000 grams per mole.

Compositions used to form the first crosslinked PVA layer contain at least one suitable crosslinking agent. Various suitable methods are available to crosslink PVA, such as using crosslinking agents including but not limited to silanes, multi-functional aldehydes, and acids. For instance, a combination of tetraethoxysilane (TEOS) and silica nanoparticles acts as a crosslinking agent for silane-modified PVA, in which crosslinking occurs between the silanes on the silane-modified PVA and the hydrolyzed TEOS groups or the silanes on the silica. See, e.g., U.S. Pat. No. 4,567,221 (Maruyama et al.) and European Patent No. 0662102B1 (Sharp). Glutaraldehyde, melamine-formaldehyde, and a combination of an aldehyde and a phenolic or naphtholic compound, are examples of suitable multi-functional aldehyde crosslinking agents. Crosslinking using aldehydes involves acetal or aminal formation between the aldehyde and the hydroxyl groups of the PVA. See, e.g., U.S. Pat. No. 4,859,717 (Hoskin et al.). Boron compounds such as boric acid or alkaline borate are also effective crosslinking agents for PVA, likely due to boronate ester formation between PVA and the borate groups. See, e.g., U.S. Pat. No. 3,692,725 (Duchane). In some embodiments, a layer comprising PVA and at least one crosslinking agent is dried and cured at elevated temperature, such as at a temperature of at least 50° C., or 80° C., for at least four minutes, or at least six minutes, or at least eight minutes, or at least ten minutes.

The amount of crosslinker included in a PVA coating composition (e.g., the first PVA coating composition) can be any suitable amount depending, for example, on the particular application and the desired properties. In many embodiments, the PVA coating composition can include up to 50 weight percent, up to 40 weight percent, up to 30 weight percent, up to 20 weight percent, or up to 10 weight percent of the crosslinker based on a total weight of the PVA coating composition. For example, the crosslinker can be in the range of 1 to 50 weight percent, 1 to 40 weight percent, 1 to 30 weight percent, 1 to 20 weight percent, 1 to 10 weight percent, 1 to 5 weight percent, or 1 to 3 weight percent.

Generally, the total weight of PVA in a coating composition comprising PVA is at least 0.1 weight percent based on the total weight of the coating composition. A coating composition often contains up to 100 weight percent, up to 80 weight percent, up to 60 weight percent, up to 40 weight percent, up to 30 weight percent, or up to 20 weight percent PVA. For example, a coating composition can include at least 1 weight percent, at least 2 weight percent, or at least 5 weight percent PVA. The amount of PVA in a coating composition can be, for example, in the range of 0.1 to 99 weight percent, in the range of 0.1 to 80 weight percent, in the range of 1 to 60 weight percent, in the range of 1 to 40 weight percent, in the range of 1 to 10 weight percent, in the range of 15 to 50 weight percent, in the range of 20 to 40 weight percent, or in the range of 0.5 to 25 weight percent. In certain embodiments in which silica nanoparticles are included in a coating composition also comprising 0.1 to 2 wt. % PVA, preferably the silica nanoparticles have an average particle size of 10 to 500 nanometers (nm), or 20 to 300 nm. Further, in such embodiments the ratio of silica nanoparticles to PVA is preferably 70:30.

A first silica layer of a multilayer coating includes a porous network of acid-sintered silica nanoparticles. The term "nanoparticle" refers to silica particles that are submicron in size. The nanoparticles have an average particle size, which typically refers to the average longest dimension of the particles, that is no greater than 500 nanometers, no greater than 200 nanometers, no greater than 100 nanometers, no greater than 75 nanometers, no greater than 50 nanometers, no greater than 40 nanometers, no greater than 25 nanometers, or no greater than 20 nanometers. The average particle size is often determined using transmission electron microscopy but various light scattering methods can be used as well. The average particle size refers to the average particle size of the primary silica nanoparticles used to form the silica layer coating. The average particle size typically refers to the average size of non-agglomerated and/or non-aggregated and/or non-sintered single nanoparticles of silica. That is, the average particle size refers to the average particle size of the primary silica nanoparticles prior to sintering under acidic conditions.

The first silica layer contains multiple silica nanoparticles that are joined together into a three dimensional network by low temperature (e.g., at or near room temperature) sintering in the presence of an acid (i.e., chemical sintering). The silica nanoparticles in a silica layer are acid-sintered. At least some adjacent nanoparticles in the porous network tend to have bonds such as silica "necks" joining them together. These silica necks are typically formed by acidification of the silica nanoparticles, and are attributed to the catalytic action of strong acid in making and breaking siloxane bonds.

Stated differently, at least some adjacent silica nanoparticles tend to be joined together forming a three dimensional porous network. The term "network" refers to a continuous three-dimensional structure formed by linking together silica nanoparticles. The term "continuous" means that the individual silica nanoparticles are linked over the dimension of the layer coating. A silica layer comprising acid-sintered silica nanoparticles typically has virtually no discontinuities or gaps in the areas where the coating composition is applied to the substrate. The term "agglomerated" refers to multiple bonding between the silica particles which have many points of contact with one or another. As result of the necking, bonding or entanglements of the silica particles, the original particle shapes may be deformed. Transmission electron microscopy generally reveals that at least 25%, preferably at least 50% of the silica particles in the resultant coatings are bonded to adjacent particles.

Figure 1B:
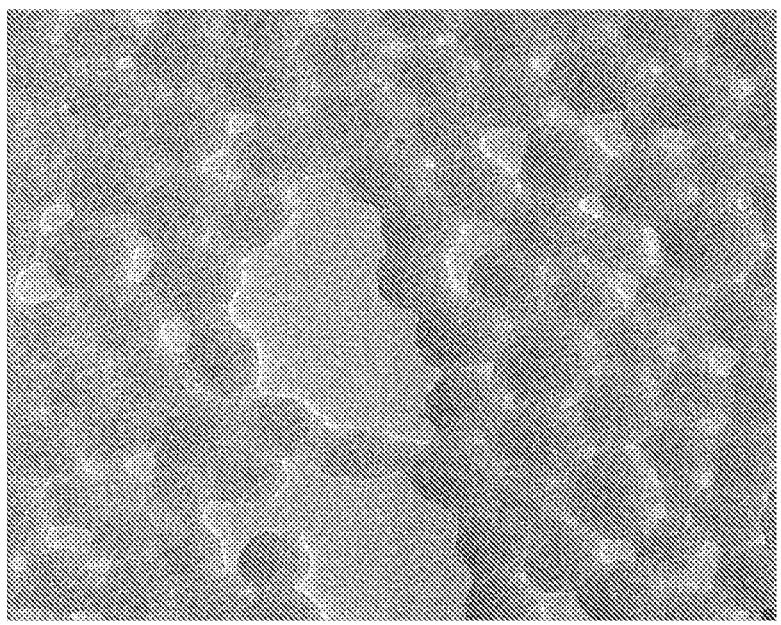
FIG. 1B is a transmission electron micrograph of an exemplary silica layer formed using acid-sintered silica nanoparticles.

FIG. 1A is a transmission electron micrograph of a layer of silica nanoparticles from ethanol at a basic pH. The layer is non-uniform and the individual particles are not linked to the adjacent particles. In contrast to FIG. 1A, FIG. 1B is a transmission electron micrograph of one example silica layer comprising acid-sintered silica nanoparticles. Unlike fumed silica particles that are simply chains of sintered silica nanoparticles, the acid-sintered layer is a continuous network of chemically sintered interconnected nanoparticles, which can be arranged to form a three-dimensional layer. The chains of fumed silica are not connected together and typically form a layer by combination with a binder such as a polymeric binder. The silica layers of the acid-sintered silica nanoparticles generally do not include an organic binder. Rather, any organic materials present in the silica layer are simply located within various pores (e.g., voids) of the interconnected network. Further, fumed silica particles are formed at relatively high temperatures such as at temperatures greater than 300° C., greater than 400° C., or greater than 500° C. In contrast, the acid-sintered layer is formed by sintering the silica nanoparticles at relatively low temperatures such as at or near room temperature in the presence of an acid.

The term "porous" refers to the presence of voids between the individual silica nanoparticles within the continuous silica layer. Preferably, when dried, the network has a porosity of 20 to 50 volume percent, 25 to 45 volume percent, or 30 to 40 volume percent. In some embodiments the porosity may be higher. Porosity may be calculated from the refractive index of the coating according to published procedures such as in W. L. Bragg, A. B. Pippard, *Acta Crystallographica*, volume 6, page 865 (1953). Porosity tends to correlate to the roughness of the surface. The porosity tends to also correlate with the hydrophilicity of the surface. That is, increased surface roughness tends to lead to increased hydrophilicity. Porosity of the surface can often be increased by using silica nanoparticles with a larger average particle size or by using a mixture of silica nanoparticles with different shapes.

Not wishing to be bound by theory, it is believed that the agglomerates of the silica nanoparticles are formed by through acid-catalyzed siloxane bonding in combination with protonated silanol groups at the particle surfaces and these agglomerates explain the coatability on hydrophobic organic surfaces, as these groups tend to be bonded, adsorbed, or otherwise durably attached to hydrophobic surfaces. Although aqueous organic solvent-based coatings of nanoparticle silica dispersions have been described, such mixtures of water and an organic solvents may suffer from differential evaporation rates that result in continuously changing composition of the liquid phase, which consequently changes the coating properties; resulting in poor uniformity and defects. Although surfactants may help the wetting property of dispersions, they may interfere with interparticular and interfacial substrate adhesion.

The primary silica nanoparticles used to prepare acid-sintered silica coating compositions can have any desired shape or mixture of shapes. The silica nanoparticles can be spherical or non-spherical (i.e., acicular) with any desired aspect ratio. Aspect ratio refers to the ratio of the average longest dimension of the nanoparticles to the average shortest dimension of acicular silica nanoparticles. The aspect ratio of acicular silica nanoparticles is often at least 2:1, at least 3:1, at least 5:1, or at least 10:1. Some acicular nanoparticles are in the shape of rods, ellipsoids, needles, and the like. The shape of the nanoparticles can be regular or irregular. The porosity of the coatings can be varied by changing the amount of regular and irregular shaped nanoparticles in the composition and/or by changing the amount of spherical and acicular nanoparticles in the composition.

If the silica nanoparticles are spherical, the average diameter is often up to 500 nanometers, less than 50 nanometers, less than 40 nanometers, less than 25 nanometers, or less than 20 nanometers, or up to 20 nanometers. Some nanoparticles can have an even smaller average diameter such as less than 10 nanometers or less than 5 nanometers.

If the silica nanoparticles are acicular, they often have an average width (smallest dimension) equal to at least 1 nanometer, at least 2 nanometers, or at least 5 nanometers. The average width of acicular silica nanoparticles is often no greater than 25 nanometers, no greater than 20 nanometers, or no greater than 10 nanometers. The acicular silica nanoparticles can have an average length $D_1$ measured by dynamic light scattering methods that is, for example, at least 40 nanometers, at least 50 nanometers, at least 75 nanometers, or at least 100 nanometers. The average length $D_1$ (e.g., longer dimension) can be up to 200 nanometers, up to 400 nanometers, or up to 500 nanometers. The acicular colloidal silica particles may have degree of elongation $D_1/D_2$ in a range of 5 to 30, wherein $D_2$ means a diameter in nanometers calculated by the equation $D_2=2720/S$ and S means specific surface area in meters squared per gram ($m^2$/gram) of the nanoparticle, as described in U.S. Pat. No. 5,221,497 (Watanabe et al.).

In many embodiments, the silica nanoparticles are selected to have an average specific surface area equal to at least 150 $m^2$/gram, at least 200 $m^2$/gram, at least 250 $m^2$/gram, at least 300 $m^2$/gram, or at least 400 $m^2$/gram. Spherical nanoparticles having average specific surface areas equal to at least 150 $m^2$/gram often have an average diameter less than 40 nanometers, less than 30 nanometers, less than 25 nanometers, or less than 20 nanometers.

In certain embodiments, the silica nanoparticles preferably have an average particle size (i.e., longest dimension) that is no greater than 50 nanometers, no greater than 40 nanometers, no greater than 25 nanometers, or up to 20 nanometers. If desired, larger silica nanoparticles may be added in limited amounts that do not deleteriously decrease the coatability of the silica coating composition on a selected substrate or another coating layer, that do not reduce the desired transmissivity of the resulting layer, and/or that do not reduce the desired hydrophilicity of the resulting layer. Thus, various sizes and/or various shapes of particles may be used in combination.

In certain embodiments, bimodal distributions of particle sizes may be used. For example, nanoparticles having an average particle size of at least 50 nanometers (e.g., in the range of 50 to 200 nanometers or in the range of 50 to 100 nanometers) can be used in combination with nanoparticles having an average diameter no greater than 40 nanometers. The weight ratio of the larger to smaller nanoparticles can be in the range of 2:98 to 98:2, in the range of 5:95 to 95:5, in the range of 10:90 to 90:10, or in the range of 20:80 to 80:20. Coating compositions having a bimodal distribution of silica nanoparticles can include 0.1 to 20 weight percent silica nanoparticles having an average particle size of 40 nanometers or less and 0 to 20 weight percent silica nanoparticles having an average particle size of 50 nanometers or greater. The amount is based on a total weight of the silica coating composition. In certain embodiments, coating compositions having a bimodal distribution of silica nanoparticles include particles with average diameters of about 5 nanometers as well as particles with average diameters of about 20 nanometers.

Generally, the total weight of silica nanoparticles (regardless of size) in a silica coating composition is at least 0.1 weight percent based on the total weight of the layer coating composition. For example, a silica coating composition can include at least 1 weight percent, at least 2 weight percent, or at least 5 weight percent silica nanoparticles. A silica coating composition often contains up to 50 weight percent, up to 40 weight percent, up to 25 weight percent up to 20 weight percent, or up to 10 weight percent silica nanoparticles. The amount of silica nanoparticles in the silica layer coating composition can be, for example, in the range of 0.1 to 50 weight percent, in the range of 1 to 40 weight percent, in the range of 1 to 25 weight percent, in the range of 1 to 20 weight percent, in the range of 5 to 20 weight percent, in the range of 1 to 10 weight percent, in the range of 5 to 10 weight percent, or in the range of 1 to 7 weight percent.

The silica nanoparticles are typically commercially available in the form of a silica sol. Some example spherical silica nanoparticles are available in the form of aqueous-based silica sols such as those commercially available under the trade designation LUDOX (e.g., LUDOX SM) from E.I. DuPont de Nemours and Co., Inc. (Wilmington, Del.). Other example aqueous-based silica sols are commercially available under the trade designation NYACOL from Nyacol Co. (Ashland, Mass.). Still other example aqueous-based silica sols are commercially available under the trade designation NALCO (e.g., NALCO 1115, NALCO 2326, and NALCO 1130) from Ondea Nalco Chemical Co. (Oak Brook, Ill.). Yet other example aqueous-based silica sols are commercially available under the trade designation REMASOL (e.g., REMASOL SP30) from Remet Corporation (Utica, N.Y.) and under the trade designation SILCO (e.g., SILCO LI-518) from Silco International (Portland, Oreg.). Further suitable spherical silica nanoparticles may be obtained in the form of aqueous-based silica sols under the trade designation SNOWTEX from Nissan Chemical Industries (Tokyo, Japan).

Suitable non-spherical (i.e., acicular) silica nanoparticles may be obtained in the form of aqueous-based silica sols under the trade designation SNOWTEX from Nissan Chemical Industries (Tokyo, Japan). For example, SNOWTEX-UP contains silica nanoparticles having a diameter in the range of about 9 to 15 nanometers with lengths in a range of 40 to 300 nanometers. SNOWTEX-PS-S and SNOWTEX-PS-M have a chain of beads morphology. The SNOWTEX-PS-M particles are about 18 to 25 nanometers in diameter and have lengths of 80 to 150 nanometers. The SNOWTEX-PS-S has a particle diameter of 10-15 nm and a length of 80-120 nanometers.

Either water or a water-miscible organic solvent can be used to dilute commercially available aqueous-based silica sols.

The silica coating composition (e.g., the first silica coating composition) contains an acid having a pKa ($H_2O$) that is less than or equal to 3.5. The use of weaker acids such as those having a pKa greater than 4 (e.g., acetic acid) typically does not result a uniform coating (i.e., layer) having desirable transmissivity and/or durability. In particular, coating compositions with weaker acids such as acetic acid typically bead up on the surface of a substrate. The pKa of the acid added to the coating composition is often less than 3, less than 2.5, less than 2, less than 1.5, or less than 1. Useful acids that can be used to adjust the pH of the silica coating composition include both organic and inorganic acids. Example acids include, but are not limited to, oxalic acid, citric acid, $H_2SO_3$, $H_3PO_4$, $CF_3CO_2H$, HCl, HBr, HI, $HBrO_3$, $HNO_3$, $HClO_4$, $H_2SO_4$, $CH_3SO_3H$, $CF_3SO_3H$, $CF_3CO_2H$, and $CH_3SO_2OH$. In many embodiments, the acid is HCl, $HNO_3$, $H_2SO_4$, or $H_3PO_4$. Without wishing to be bound by theory, it is believed that some of the silica in contact with acid undergoes a condensation reaction in which silicon dioxide is reacted with acid to form a silicic acid. The silicic acid is capable of forming a continuous three-dimensional porous network of interconnected acid-sintered silica nanoparticles upon drying of the acidified silica coating composition. In some embodiments, it is desirable to provide a mixture of an organic and inorganic acid. If commercially available acidic silica sols are used, the addition of one of the acids listed above typically result in silica layers having the desired uniformity.

The silica coating composition (e.g., the first silica coating composition) generally contains sufficient acid to provide a pH no greater than 5. The pH is often no greater than 4.5, no greater than 4, no greater than 3.5, or no greater than 3. For example, the pH is often in the range of 2 to 5. In some embodiments, the silica coating composition can be adjusted to a pH in the range of 5 to 6 after first reducing the pH to less than 5. This pH adjustment can allow the coating of pH sensitive substrates. The acid-sintered silica nanoparticles appear to be stable when the pH is in the range 2 to 4. Light-scattering measurements have demonstrated that the acidified silica nanoparticles at pH in the range of 2 to 3 and at a concentration of 10 weight percent silica nanoparticles can retain the same size for more than a week or even more than a month. Such acidified silica coating compositions are expected to remain stable even longer if the concentration of silica nanoparticles is lower than 10 weight percent.

Silica coating compositions (e.g., the first silica coating composition) typically further include water or a mixture of water plus a water-miscible organic solvent. Suitable water-miscible organic solvents include, but are not limited to, various alcohols (e.g., ethanol or isopropanol) and glycols (e.g., propylene glycol), ethers (e.g., propylene glycol methyl ether), ketones (e.g., acetone), and esters (e.g., propylene glycol monomethyl ether acetate). The silica nanoparticles included in the silica coating compositions typically are not surface modified.

In some embodiments, optional silane coupling agents, which contain a plurality of reactive silyl groups, can be added to the silica coating compositions (e.g., the first silica coating composition). Some example coupling agents include, but are not limited to, tetraalkoxysilanes (e.g., tetraethylorthosilicate (TEOS)) and oligomeric forms of tetraalkoxysilane such as alkyl polysilicates (e.g., poly(diethoxysiloxane). These coupling agents may, at least in some embodiments, improve binding between silica nanoparticles. If added, the coupling agent is typically added to the silica coating composition at levels of 0.1 to 30 weight percent based on the weight of the silica nanoparticles in the coating composition. In some examples, the coupling agent is present in an amount in the range of 0.1 to 25 weight percent based on the weight of the silica nanoparticles, in the range of 1 to 25 weight percent, in the range of 5 to 25 weight percent, in the range of 10 to 25 weight percent, in the range of 0.1 to 20 weight percent, in the range of 1 to 20 weight percent, in the range of 1 to 15 weight percent, in the range of 1 to 10 weight percent, or in the range of 1 to 5 weight percent based on the weight of silica nanoparticles. In other examples, however, the silica coating compositions do not include a coupling agent. Many silica coating compositions do not contain other types of binders other than coupling agents. That is, many silica coating compositions do not contain typical polymeric binders, or at most up to 25 weight percent polymeric resins, which fill up void volume between interconnected silica particles rather than binding the silica nanoparticles together.

As applied to a substrate surface and/or as an intermediary layer, the silica coating composition (e.g., the first silica coating composition) is a sol. After the silica coating composition is applied to the substrate or other layer, a gelled material forms as the sol dries and the silica nanoparticles sinter to form the continuous network.

The first silica layer can be located adjacent to any substrates, which are discussed in greater detail below. The term "adjacent" in reference to the first silica layer means that the first silica layer can contact a surface of the substrate or can be separated from a surface of the substrate by one or more intermediary layers. In most embodiments, the first silica coating composition is applied to contact the substrate. The substrate can be an organic material (e.g., polymeric) or inorganic material (e.g., glass, ceramic, or metal). In many embodiments, the substrate is hydrophobic. The wetting property of such first silica coating compositions on hydrophobic surfaces (e.g., hydrophobic polymeric substrates such as polyethylene terephthalate (PET) or polycarbonate (PC)) is a function of the pH of the first silica coating compositions and the pKa of the acid used to adjust the pH. The coating compositions can be applied, for example, to hydrophobic substrates when acidified to a pH in the range of 2 to 5. In contrast, similar silica coating compositions with a neutral or basic pH tend to bead up on the hydrophobic substrates.

The first silica coating compositions are typically applied to the substrate using conventional techniques such as, for example, bar coating, roll coating, curtain coating, rotogravure coating, knife coating, spray coating, spin coating, dip coating, or slide coating techniques. Coating techniques such as bar coating, roll coating, and knife coating are often used to adjust the thickness of the bottom layer coating. The first silica coating compositions can be coated on one or more sides of the substrate.

Once applied to the substrate, the coated first silica coating composition is typically dried at temperatures in a range from 20° C. to 150° C. An oven with circulating air or inert gas such as nitrogen is often used for drying purposes. The temperature may be increased further to speed the drying process, but care should be exercised to avoid damage to the substrate. For inorganic substrates, the drying temperature can be above 200° C.

The optimal average dry coating thickness of a first silica layer is dependent upon the particular first silica coating composition used. In general, average thickness of the (dry) first silica layer is in the range of 100 to 10,000 angstroms (Å), in the range of 500 to 2500 Å, in the range of 750 to 2000 Å, or in the range of 1000 to 1500 Å. The thickness can be measured using an ellipsometer such as a Gaertner Scientific Corp. Model No. L115C. Although the actual coating thickness can vary considerably from one particular point to another, it is often desirable to apply the first silica coating composition uniformly over the surface of the substrate. For example, to minimize visible interference color variations in the coating, it may be desirable to control the average coating thickness within 200 Å, within 150 Å, or within 100 Å across the substrate.

Alternatively, the typical average (dry) coating thickness of a silica layer coating is in the range of 1000 to 100,000 Å, in the range of 1000 to 50,000 Å, in the range of 1000 to 20,000 Å, in the range of 5000 to 15,000 Å, in the range of 5000 to 10,000 Å, or in the range of 1000 to 10,000 Å. Each silica layer typically contains at least 75 weight percent, at least 80 weight percent, at least 85 weight percent silica nanoparticles, based on a total weight of the dried silica layer. The (dried) silica layer can contain up to 90 weight percent, up to 95 weight percent, or up to 99 percent or higher silica nanoparticles based on the total weight of the dried silica layer. For example, the dried silica layer can contain 75 to greater than 99 weight percent, 75 to 95 weight percent, 75 to 90 weight percent, 75 to 99 weight percent, 85 to 99 percent, 85 to 95 percent, 80 to 99 weight percent, or 85 to 95 weight percent silica nanoparticles.

The bottom layer can contain some water such as the amount of water typically associated with equilibrium of the layer with the atmospheric moisture present in the environment of the bottom layer. This equilibrium amount of water is typically no greater than 5 weight percent, not greater than 3 weight percent, no greater than 2 weight percent, no greater than 1 weight percent, or not greater than 0.5 weight percent based on a total weight of the (dried) bottom layer.

In many embodiments, the layer attached to the article substrate in the multilayer coating construction is the first silica layer that is a layer of acid-sintered silica nanoparticles. In certain embodiments, a small amount of PVA is included in this first silica layer, for example less than 20% by weight, or less than 15% by weight, or less than 10% by weight, or less than 5% by weight, of the total first silica layer. Such a layer primarily improves adhesion of the multilayer coating to the substrate. Typical first silica coating compositions containing the acidified silica nanoparticles usually are applied to a substrate surface and then dried. In many embodiments, the first silica coating composition contains (a) silica nanoparticles having an average particle diameter (i.e., average particle diameter prior to acid-sintering) of up to 20 nanometers and (b) an acid with a pKa ($H_2O$) that is less than or equal to 3.5. The pH of the first silica coating composition is pH is less than or equal to 5 such as in the pH range of 2 to 5.

In some embodiments, coating compositions including composites of both PVA and silica nanoparticles contain more PVA (by weight) than silica nanoparticles, in some embodiments composites contain more silica nanoparticles (by weight) than PVA, and in alternate embodiments the composites contain approximately equal amounts by weight of PVA and silica nanoparticles. For convenience, a layer is referred to herein as a "silica layer" if it contains 75% or greater by weight (of the dried layer) of silica nanoparticles. When the silica nanoparticles are acid-sintered silica nanoparticles, the silica layer typically forms a continuous three-dimensional porous network of interconnected silica nanoparticles when the silica layer contains 75% or greater by weight of the dried silica layer. Without wishing to be bound by theory, it is believed that additional components included in such silica layers are located within the pores of the continuous network of acid-sintered silica nanoparticles. In contrast, for convenience a layer is referred to herein as a "PVA layer" if it contains greater than 50% by weight (of the dried layer) of PVA. Any suitable silica nanoparticles may be included in a PVA layer or a silica layer, for example and without limitation commercially available silica nanoparticles, acid-sintered silica nanoparticles, etc. The silica nanoparticles are optionally acid-sintered or not acid-sintered silica nanoparticles, but preferably acid-sintered silica nanoparticles. Further, for convenience, a layer is referred to as an "intermediary layer" regardless of how much PVA, silica nanoparticles, or combinations thereof that the layer contains with the proviso that it is positioned anywhere other than as the outermost layer of the multilayer coating (i.e. attached to a major surface of a substrate or located anywhere between a substrate and an outermost layer), as previously defined.

In certain circumstances, the inclusion of silica nanoparticles in a layer comprising PVA improves the adhesion of the layer to at least one adjacent layer that contains silica particles. Similarly, in certain circumstances, the inclusion of a small amount of PVA in a layer comprising a larger amount of silica nanoparticles improves the adhesion of the layer to at least one adjacent layer that contains PVA.

The typical average (dry) coating thickness of a top or intermediary layer coating is in the range of 1000 to 300,000 Å, in the range of 10,000 to 200,000 Å, in the range of 10,000 to 100,000 Å, in the range of 20,000 to 80,000 Å, in the range of 5000 to 50,000 Å, or in the range of 1000 to 10,000 Å.

The outermost crosslinked PVA layer comprises at least 50 weight percent PVA. For example, the crosslinked PVA layer can comprise 50 to 100 weight percent, 50 to 99 weight percent, 50 to 90 weight percent, 50 to 75 weight percent, 60 to 99 weight percent, 60 to 80 weight percent, 70 to 99 weight percent, 80 to 99 weight percent, or 90 to 99 weight percent. Additional intermediary layers comprising PVA typically each contain at least 40 weight percent, at least 25 weight percent, at least 15 weight percent, at least 10 weight percent, at least 5 weight percent, or at least 3 weight percent PVA based on a total weight of the (dried) intermediary layer. For example, an intermediary layer containing PVA can contain 3 to 99 weight percent, 3 to 49 weight percent, 5 to 49 weight percent, 5 to 40 weight percent, 3 to 15 weight percent, 3 to 10 percent, 3 to 7 weight percent, 10 to 30 weight percent, or 15 to 25 weight percent PVA.

Figure 2:
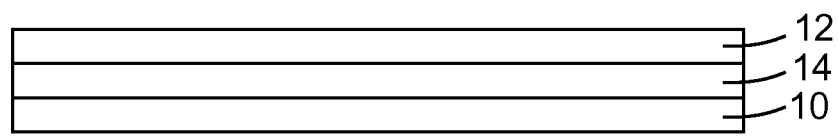
FIG. 2 is an exemplary schematic of a two-layer multilayer coating on a substrate.
Figure 3:
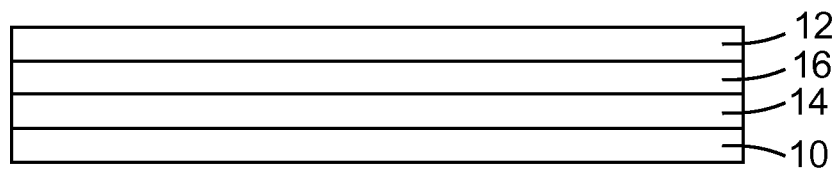
FIG. 3 is an exemplary schematic of a three-layer multilayer coating on a substrate.
Figure 4:
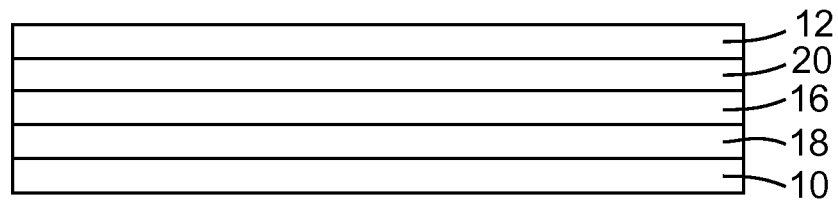
FIG. 4 is an exemplary schematic of a four-layer multilayer coating on a substrate.

FIG. 2 is an exemplary schematic of a two-layer multilayer coating on a substrate 10. In particular, FIG. 2 illustrates an outermost (top) crosslinked PVA layer 12 and a first intermediary silica layer 14 disposed between the substrate 10 and the outermost crosslinked PVA layer 12. In certain embodiments, the first intermediary silica layer 14 is a bottom silica layer 14 attached to the substrate 10. FIG. 3 is an exemplary schematic of a three-layer multilayer coating on a substrate 10. FIG. 3 illustrates an outermost crosslinked PVA layer 12 and a first intermediary silica layer 14 disposed between the substrate 10 and the outermost crosslinked PVA layer 12, as well as a second intermediary layer 16 disposed between the first intermediary silica layer 14 and the outermost crosslinked PVA layer 12. FIG. 4 is an exemplary schematic of a four-layer multilayer coating on a substrate 10. FIG. 4 illustrates an outermost crosslinked PVA layer 12 and a second intermediary layer 16 disposed between the substrate 10 and the outermost crosslinked PVA layer 12, as well as a third intermediary layer 18 disposed between the substrate 10 and the second intermediary layer 16 and a fourth intermediary layer 20 disposed between the second intermediary layer 16 and the outermost crosslinked PVA layer 12. The second, third, and fourth intermediary layers, if present, optionally independently comprise PVA, silica nanoparticles, crosslinked PVA, and combinations thereof. At least one of the second, third, and fourth intermediary layers comprises a silica layer. Other layers may also be included in the multilayer coatings according to embodiments of the present invention, including layers generally known in the art of multilayer coatings, such as tie layers, oxygen barrier layers, print layers, and the like.

The overall coating construction may be applied by sequential coating of each coating composition (e.g., multi-pass). Preferably, the silica coating compositions include acid-sintered silica nanoparticles. PVA coating compositions include PVA, which is optionally silane-modified PVA.

In embodiments of the article, preferred substrates are made of polyester (e.g., polyethylene terephthalate, polybutyleneterephthalate), polycarbonate, allyldiglycolcarbonate, polyacrylates, such as polymethylmethacrylate, polystyrene, polysulfone, polyethersulfone, homo-epoxy polymers, epoxy addition polymers with polydiamines, polydithiols, polyethylene copolymers, fluorinated surfaces, cellulose esters such as acetate and butyrate, glass, ceramic, organic and inorganic composite surfaces and the like, including blends and laminates thereof.

Typically the substrate is in the form of a film, sheet, panel or pane of material and may be a part of an article such as traffic signs, solar panels, architectural glazings, decorative glass frames, and motor vehicle windows and windshields. The coatings may, optionally if desired, cover only a portion of the article. The substrate may be flat, curved or shaped. Preferably, the substrate is selected from the group consisting of a polymeric film, a polymeric sheet, a molded polymeric part, a metal, paper, a UV mirror, a UV stable substrate, a glass substrate, a mirror, a display, a window, or a release liner. The article to be coated may be produced by blowing, casting, pultrusion, extrusion, or injection molding, also by photopolymerization, compression molding or reactive injection molding.

Suitable polymeric materials for substrates include, but are not limited to, polyesters (e.g., polyethylene terephthalate or polybutylene terephthalate), polycarbonates, acrylonitrile butadiene styrene (ABS) copolymers, poly(meth) acrylates (e.g., polymethylmethacrylate or copolymers of various (meth)acrylates), polystyrenes, polysulfones, polyether sulfones, epoxy polymers (e.g., homopolymers or epoxy addition polymers with polydiamines or polydithiols), polyolefins (e.g., polyethylene and copolymers thereof or polypropylene and copolymers thereof), polyvinyl chlorides, polyurethanes, fluorinated polymers, cellulosic materials, derivatives thereof, and the like.

Suitable metals include, for example, pure metals, metal alloys, metal oxides, and other metal compounds. Examples of metals include, but are not limited to, chromium, iron, aluminum, silver, gold, copper, nickel, zinc, cobalt, tin, steel (e.g., stainless steel or carbon steel), brass, oxides thereof, alloys thereof, and mixtures thereof.

In some embodiments, where increased transmissivity is desired, the substrate is transparent. The term "transparent means" transmitting at least 85% of incident light in the visible spectrum (about 400-700 nm wavelength). Transparent substrates may be colored or colorless. In other embodiments, where increased hydrophilicity is desired, the substrate may be initially hydrophobic. The compositions may be applied to a wide variety of substrates by a variety of coating methods. As used herein, "hydrophilic" is used only to refer to the surface characteristics of the thermoplastic polymer layer, i.e., that it is wet by aqueous solutions, and does not express whether or not the layer absorbs aqueous solutions. Accordingly, a thermoplastic polymer layer may be referred to as hydrophilic whether or not the layer is impermeable or permeable to aqueous solutions. Surfaces on which drops of water or aqueous solutions exhibit a static water contact angle of less than 50° are referred to as "hydrophilic." Hydrophobic substrates have a water contact angle of 50° or greater. Coatings described herein may increase the hydrophilicity of a substrate at least 10 degrees, preferably at least 20 degrees.

In some embodiments, the substrate is hydrophobic. The terms "hydrophobic" and "hydrophobicity" refer to a surface on which drops of water or aqueous solutions exhibit a static water contact angle of at least 50 degrees, at least 60 degrees, at least 70 degrees, at least 90 degrees, or at least 100 degrees. In order to uniformly coat, or to enhance the interfacial adhesion, of a composition onto a hydrophobic substrate from an aqueous system it may be desirable to increase the surface energy of the substrate and/or reduce the surface tension of the coating composition. The substrate can be treated using, e.g., chemical treatment, mechanical roughening, corona treatment such as air or nitrogen corona, plasma, flame, or actinic radiation. If desired, an optional tie coating composition can also be applied between the substrate and the additional coating compositions (e.g., silica or PVA coating compositions) to increase the interlayer adhesion. Alternatively, the surface tension of the bottom coating composition may be decreased by addition of lower alcohols (e.g., alcohols having 1 to 8 carbon atoms, 1 to 6 carbon atoms, or 1 to 4 carbon atoms). The other side of the substrate may also be treated using the above-described treatments to improve adhesion between the substrate and an adhesive. In some embodiments, however, in order to improve the coating hydrophilicity for desired antifogging properties and to ensure uniform coating of the article from an aqueous or hydroalcoholic solution, it may be beneficial to add a wetting agent, which is typically a surfactant.

Surfactants are molecules having both hydrophilic (polar) and hydrophobic (non-polar) regions and that are capable of reducing the surface tension of the bottom coating composition. Useful surfactants may include those disclosed, for example, in U.S. Pat. No. 6,040,053 (Scholz et al.). If added, the surfactant is typically present in an amount up to 5 weight percent based on a total weight of the bottom coating composition. For example, the amount can be up to 4 weight percent, up to 2 weight percent, or up to 1 weight percent. The surfactant is typically present in an amount equal to at least 0.001 weight percent, at least 0.005 weight percent, at least 0.01 weight percent, at least 0.05 weight percent, at least 0.1 weight percent or at least 0.5 weight percent of a total coating composition.

Some surfactants for use in the bottom coating compositions (e.g., silica or PVA coating compositions) are anionic surfactants. Useful anionic surfactants often have a molecular structure with (1) at least one hydrophobic group such as a $C_6$-$C_{20}$ alkyl, alkylaryl, and/or alkenyl groups, (2) at least one anionic group such as sulfate, sulfonate, phosphate, polyoxyethylene sulfate, polyoxyethylene sulfonate, polyoxyethylene phosphate, and the like, and/or the salts of such anionic groups. Suitable salts include alkali metal salts, ammonium salts, tertiary amino salts, and the like. Representative commercial examples of useful anionic surfactants include, but are not limited to, sodium lauryl sulfate (available, for example, under the trade designation TEXAPON L-100 from Henkel Inc. (Wilmington, Del.) and under the trade designation POLYSTEP B-3 from Stepan Chemical Co. (Northfield, Ill.)); sodium lauryl ether sulfate (available, for example, under the trade designation POLYSTEP B-12 from Stepan Chemical Co. (Northfield, Ill.)); ammonium lauryl sulfate (available, for example, under the trade designation STANDAPOL A from Henkel Inc. (Wilmington, Del.)); and sodium dodecyl benzene sulfonate (available, for example, under the trade designation SIPONATE DS-10 from Rhone-Poulenc, Inc. (Cranberry, N.J.)).

Other useful surfactants for use in the bottom coating compositions (e.g., silica or PVA coating compositions) are non-ionic surfactants. Suitable non-ionic surfactants include, but are not limited to, polyethoxylated alkyl alcohols (available, for example, under the trade designations BRIJ 30 and BRIJ 35 from ICI Americas, Inc. (Wilmington, Del.) and under the trade designation TERGITOL TMN-6 from Dow Chemical (Midland, Mich.)); polyethoxylated alkyl phenols (available, for example, under the trade designations TRITON X-100 from Roche (Mannheim, Germany) and ICONOL NP-70 from BASF Corp. (Florham Park, N.J.)); and polyethylene glycol/polypropylene glycol block copolymers (available, for example, under the trade designations TETRONIC 1502, TETRONIC 908, and PLURONIC F38 from BASF Corp. (Florham Park, N.J.)).

In some embodiments, an article is provided comprising a substrate and a multilayer coating attached to the substrate. The multilayer coating comprises a first crosslinked PVA layer that is an outermost layer of the multilayer coating, and a first silica layer disposed between a surface of the substrate and the outermost crosslinked PVA layer. The first silica layer comprises a plurality of acid-sintered interconnected silica nanoparticles arranged to form a continuous three-dimensional porous network. Optionally, the article further comprises one or more second PVA layers disposed between the first crosslinked PVA layer and the first silica layer, between the first silica layer and the substrate, or both.

In some embodiments, an article is provided comprising a substrate and a multilayer coating attached to the substrate. The multilayer coating comprises a first crosslinked PVA layer that is an outermost layer of the multilayer coating, and a first intermediary silica layer disposed between a surface of the substrate and the outermost crosslinked PVA layer. The first intermediary silica layer comprises a plurality of acid-sintered interconnected silica nanoparticles arranged to form a continuous three-dimensional porous network. Optionally, the article further comprises one or more second intermediary layers disposed between the first crosslinked PVA layer and the first intermediary silica layer, between the first intermediary silica layer and the substrate, or both, wherein each of the one or more second intermediary layers comprises PVA, silica nanoparticles, or a combination thereof.

In some embodiments, an article is provided including a substrate and a multilayer coating attached to the substrate. The multilayer coating comprises a first crosslinked PVA layer that is an outermost layer of the multilayer coating, and a bottom layer attached to a surface of the substrate and disposed between the surface of the substrate and the first crosslinked PVA layer. The bottom layer comprises a plurality of acid-sintered interconnected silica nanoparticles arranged to form a continuous three-dimensional porous network. In some embodiments, an article is provided including a substrate and a multilayer coating attached to the substrate. The multilayer coating comprises a first crosslinked PVA layer that is an outermost layer of the multilayer coating, a bottom layer comprising acid-sintered silica nanoparticles, and a first intermediary layer located between the first crosslinked PVA layer and the bottom layer. In some embodiments, an article is provided including a substrate and a multilayer coating attached to the substrate. The multilayer coating comprises a first crosslinked PVA layer that is an outermost layer of the multilayer coating, a bottom layer comprising acid-sintered silica nanoparticles, a first intermediary layer located between the first crosslinked PVA layer and the bottom layer, and a second intermediary layer located between the first crosslinked PVA layer and the first intermediary layer. In some embodiments, the article includes a third or fourth intermediary layer disposed between the bottom layer and the first crosslinked PVA layer. Each of the second intermediary layer, third intermediary layer, and fourth intermediary layer includes PVA, a plurality of silica nanoparticles, or both.

In some embodiments, an article is provided including a substrate and a multilayer coating attached to the substrate. The multilayer coating comprises a first crosslinked PVA layer that is an outermost layer of the multilayer coating, a first intermediary layer located between the first crosslinked PVA layer and the substrate, and a second intermediary layer located between the first crosslinked PVA layer and the first intermediary layer. In some embodiments, the article includes a third or fourth intermediary layer disposed between the first intermediary layer and the substrate. The first intermediary layer includes PVA. The second intermediary layer comprises a plurality of acid-sintered interconnected silica nanoparticles arranged to form a continuous three-dimensional porous network. Each of the optional third and fourth intermediary layers comprises PVA, a plurality of silica nanoparticles, crosslinked PVA, or combinations thereof.

When one or more intermediary layers comprise PVA, it is optionally crosslinked PVA. In certain embodiments, the PVA comprises a silane-modified PVA. In certain embodiments, each of the bottom layer and second intermediary layer comprises acid-sintered silica nanoparticles and each of the first intermediary layer and first crosslinked PVA layer comprises PVA. Such an article thus contains four alternating silica/PVA/silica/PVA (e.g., inorganic/organic/inorganic/organic) coating layers wherein one PVA layer is an intermediary layer and the other is a top crosslinked PVA layer. As discussed above, each inorganic coating layer may also contain an amount of organic material, and each organic coating layer may also contain an amount of inorganic material.

For instance, in an article including a substrate and a plurality of coating layers, the layers can have one of the following nonlimiting exemplary structures:

1. Substrate/first silica layer/first crosslinked PVA layer
2. Substrate/first intermediary layer/first silica layer/first crosslinked PVA layer
3. Substrate/first silica layer/first intermediary layer/first crosslinked PVA layer
4. Substrate/first silica layer/first intermediary layer/second intermediary layer/first crosslinked PVA layer
5. Substrate/first intermediary layer/second intermediary layer/first silica layer/first crosslinked PVA layer
6. Substrate/first intermediary layer/first silica layer/second intermediary layer/first crosslinked PVA layer
7. Substrate/first intermediary layer/first silica layer/second intermediary layer/third intermediary layer/first crosslinked PVA layer
8. Substrate/first silica layer/first intermediary layer/second intermediary layer/third intermediary layer/first crosslinked PVA layer
9. Substrate/first intermediary layer/second intermediary layer/third intermediary layer/first silica layer/first crosslinked PVA layer
10. Substrate/first intermediary layer/second intermediary layer/first silica layer/third intermediary layer/first crosslinked PVA layer In certain embodiments an article is provided including a substrate and a multilayer coating attached to the substrate. The multilayer coating comprises a bottom layer attached to a surface of the substrate, a first PVA layer attached to the bottom layer and containing PVA and a plurality of silica nanoparticles, a first silica layer attached to the first PVA layer, and a crosslinked PVA layer attached to the first silica layer. The crosslinked PVA layer is the outermost layer. Preferably, each of the bottom layer and the first silica layer comprises a plurality of acid-sintered interconnected silica nanoparticles arranged to form a continuous three-dimensional porous network. Optionally, the bottom layer and first silica layer further contain PVA. In other embodiments, an article is provided including a substrate and a multilayer coating attached to the substrate. The multilayer coating comprises a bottom layer attached to a surface of the substrate, a first silica layer attached to the bottom layer and comprising a plurality of silica nanoparticles and PVA, a first PVA layer attached to the first silica layer, and a crosslinked PVA layer that is an outermost layer, attached to the first PVA layer. Each of the bottom layer and the first silica layers comprises a plurality of acid-sintered interconnected silica nanoparticles arranged to form a continuous three-dimensional porous network. The PVA layer comprises PVA and silica nanoparticles. Optionally, the PVA comprises silane-modified PVA.

Minor amounts of other optional components can be added to the coating compositions that may impart desirable properties, that may be desirable for particular curing methods or conditions, or that may be desirable for particular surface treatment applications. Examples of other optional components include, but are not limited to, catalysts, initiators, surfactants, stabilizers, anti-oxidants, flame retardants, ultraviolet (UV) absorbers, radical quenchers, and the like, and mixtures thereof.

In a second aspect, a method of making an article is provided. The method includes (a) providing a substrate and (b) attaching a multilayer coating to the substrate. The multilayer coating includes (i) a first crosslinked poly(vinyl alcohol) (PVA) layer that is an outermost layer of the multilayer coating, and (ii) a first silica layer disposed between a surface of the substrate and the outermost crosslinked PVA layer. In some embodiments, the method further includes forming one or more additional layers in the multilayer coating, including at least one intermediary layer. Such intermediary layers are disposed between the first silica layer and the first crosslinked PVA layer, between the substrate and the first silica layer, or both. In some embodiments, at least one intermediary layer comprises PVA, and the method optionally further comprises crosslinking the PVA of the one or more intermediary layers. Crosslinking of PVA is not particularly limited; for example, crosslinking is performed using an effective crosslinking agent such as a silane (e.g., tetraethoxysilane), a multi-functional aldehyde (e.g., melamine formaldehyde), or an acid (e.g., boric acid), as discussed in detail above.

Forming the first silica layer typically comprises preparing a dispersion containing the silica nanoparticles acidified with an acid having a pKa less than 3.5 to a pH in a range of 2 to 5, coating the dispersion on the substrate, and drying the coating to form the plurality of acid-sintered silica nanoparticles. The dispersion containing the silica nanoparticles optionally comprises silica nanoparticles having a bi-modal size distribution, and/or the dispersion containing the silica nanoparticles comprises silica nanoparticles having average particle diameters up to 20 nanometers.

Preferably, the method comprises layers in accordance with embodiments of the article described above. For example, the first intermediary layer formed by the method may contain a plurality of silica nanoparticles, and the second intermediary layer (if present) formed by the method may also contain a plurality of silica nanoparticles. Similarly, at least one of the intermediary silica layer(s) formed by the method may contain PVA.

The multilayer coating compositions can be applied using any suitable application method. The application method often involves forming a coating layer by dip coating, spin coating, spray coating, wiping, roll coating, brushing, spreading, flow coating, vapor deposition, slot coating, slide coating, or the like, or combinations thereof.

Typically, each coating composition can be applied to the substrate such that after curing, a multilayer coated article is formed. That is, in addition to the first silica layer, at least one intermediary layer is positioned between the substrate and the top crosslinked PVA layer. The wet thickness of each layer, for example, can independently be in the range of 0.1 to 100 micrometers, in the range of 0.1 to 50 micrometers, or in the range of 0.1 to 10 micrometers.

After application to the substrate, the coating compositions can be cured by exposure to heat and/or moisture. If a crosslinker is included in the multilayer coating composition, these materials can react with the PVA or silane-modified PVA to crosslink the PVA. Moisture cure can be effected at temperatures ranging from room temperature (for example, 20° C. to 25° C.) up to about 80° C. or more. Moisture curing times can range from a few minutes (for example, at the higher temperatures such as 80° C. or higher) to hours (for example, at the lower temperatures such as room temperature).

Various items are described that are articles or methods of making articles.

Item 1 is an article including (a) a substrate and (b) a multilayer coating attached to the substrate. The multilayer coating includes (i) a first crosslinked poly(vinyl alcohol) (PVA) layer that is an outermost layer of the multilayer coating; and (ii) a first silica layer disposed between a surface of the substrate and the outermost crosslinked PVA layer. The first silica layer comprises a plurality of acid-sintered interconnected silica nanoparticles arranged to form a continuous three-dimensional porous network.

Item 2 is an article of item 1, further including one or more second PVA layers disposed between the first crosslinked PVA layer and the first silica layer, between the first silica layer and the substrate, or both.

Item 3 is an article of item 1 or item 2, wherein the second PVA layer includes crosslinked PVA.

Item 4 is an article of any one of items 1 to 3, wherein the first silica layer further includes PVA.

Item 5 is an article of any one of items 1 to 4, wherein the first crosslinked PVA layer further includes a plurality of silica nanoparticles.

Item 6 is an article of any one of items 1 to 5, wherein the silica nanoparticles have a bi-modal size distribution.

Item 7 is an article of any one of items 1 to 6, wherein the silica nanoparticles have average particle diameters up to 20 nanometers.

Item 8 is an article of any one of items 1 to 7, wherein the plurality of acid-sintered interconnected silica nanoparticles are formed from a dispersion including the silica nanoparticles acidified with an acid having a pKa less than 3.5 to a pH in a range of 2 to 5.

Item 9 is an article of any one of items 1 to 8, wherein the first crosslinked PVA layer, the second PVA layer, or both includes a silane-modified PVA.

Item 10 is an article of any one of items 1 to 9, further including one or more second silica layers disposed between the first silica layer and the first crosslinked PVA layer.

Item 11 is an article of item 10, wherein the second silica layer comprises a plurality of acid-sintered interconnected silica nanoparticles arranged to form a continuous three-dimensional porous network.

Item 12 is an article of item 11, wherein the second silica layer further comprises PVA.

Item 13 is an article of any one of items 1 to 12, wherein the first crosslinked PVA layer contains at least one crosslinking agent selected from the group consisting of a silane, a multi-functional aldehyde, and an acid.

Item 14 is an article of any one of items 1 to 13, wherein the first crosslinked PVA layer contains at least one crosslinking agent selected from the group consisting of tetraethoxysilane, melamine formaldehyde, and boric acid.

Item 15 is an article of any one of items 1 to 14, wherein the first crosslinked PVA layer further contains a plurality of silica nanoparticles.

Item 16 is an article of item 2, wherein the one or more second PVA layers further contain a plurality of silica nanoparticles.

Item 17 is an article of any one of items 1 to 16, wherein the silica nanoparticles have average particle diameters up to 500 nanometers.

Item 18 is an article of item 6, wherein the weight ratio of a first distribution of silica nanoparticles to a second distribution of silica nanoparticles is in a range from 20:80 to 80:20.

Item 19 is an article of any one of items 1 to 18, wherein the first silica layer further contains at least 85% by weight silica nanoparticles.

Item 20 is an article of any one of items 1 to 19, wherein the first silica layer further contains a surfactant.

Item 21 is an article of any one of items 1 to 20, wherein the silica nanoparticles comprise acicular silica particles.

Item 22 is an article of any one of items 1 to 21, wherein the substrate is at least one of a polymeric film, a polymeric sheet, a molded polymeric part, a metal, paper, a UV mirror, a UV stable substrate, a glass substrate, a mirror, a display, a window, or a release liner.

Item 23 is an article of any one of items 1 to 22, wherein the substrate comprises polyethylene terephthalate (PET).

Item 24 is a method of making an article, the method including (a) providing a substrate and (b) attaching a multilayer coating to a surface of the substrate. The attaching includes (i) forming a first silica layer adjacent to the substrate, and (ii) forming a first crosslinked PVA layer. The first silica layer comprises a plurality of acid-sintered interconnected silica nanoparticles arranged to form a continuous three-dimensional porous network and the first crosslinked PVA layer is an outermost layer of the multilayer coating.

Item 25 is a method of item 24, further including forming a second PVA layer, the second PVA layer disposed between the first silica layer and the first crosslinked PVA layer.

Item 26 is a method of item 24 or item 25, wherein the first crosslinked PVA layer further includes a plurality of silica nanoparticles.

Item 27 is a method of any one of items 24 to 26, wherein forming the first silica layer includes preparing a dispersion containing the silica nanoparticles acidified with an acid having a pKa less than 3.5 to a pH in a range of 2 to 5, coating the dispersion on the substrate, and drying the coating to form the plurality of acid-sintered silica nanoparticles.

Item 28 is a method of any one of items 24 to 27, wherein the first silica layer further includes PVA.

Item 29 is a method of any one of items 24 to 28, wherein the first crosslinked PVA layer includes a silane-modified PVA.

Item 30 is a method of item 25, further including crosslinking the second PVA layer.

Item 31 is a method of item 30, wherein the crosslinking is performed using a crosslinking agent selected from the group consisting of a silane, a multi-functional aldehyde, and an acid.

Item 32 is a method of item 30 or item 31, wherein the crosslinking is performed using a crosslinking agent selected from the group consisting of tetraethoxysilane, melamine formaldehyde, and boric acid.

Item 33 is a method of item 25, wherein the second PVA layer further contains a plurality of silica nanoparticles.

Item 34 is a method of any one of items 24 to 33, wherein the silica nanoparticles have average particle diameters up to 500 nanometers.

Item 35 is a method of any one of items 24 to 34, wherein the first silica layer further contains at least 85% by weight silica nanoparticles.

Item 36 is a method of any one of items 24 to 35, wherein the first silica layer further contains a surfactant.

EXAMPLES

Objects and advantages of this invention are further illustrated by the following examples, but the particular materials and amounts thereof recited in these examples, as well as other conditions and details, should not be construed to unduly limit this invention. These examples are for illustrative purposes only and are not meant to be limiting on the scope of the appended claims.

Materials

"PET" was polyethylene terephthalate (50 micrometer (μm) or 100 μm-thick) film prepared from SCOTCHPAR available from 3M Company, St. Paul, Minn.

"NALCO DVSZN004" refers to a trade designation for an aqueous colloidal spherical silica dispersion with 41.2 weight percent solids (nominally 41 weight percent solids and average particle size of approximately 45 nanometers), commercially available from NALCO Chemical Company, Naperville, Ill.

"SILCO LI-0830" refers to a trade designation for an aqueous colloidal spherical silica dispersion with 30.5 weight percent solids (nominally 30 weight percent solids and average particle size of approximately 8 nanometers) obtained from SILCO International LLC, Portland, Oreg.

"POLYSTEP B430-S" refers to a trade designation for an aqueous surfactant solution with 29 weight percent solids, commercially available from Stepan Company, Northfield, Ill.

"KURARAY R-2105" refers to a trade designation for a silane modified polyvinyl alcohol polymer commercially available from Kuraray Co. LTD, Japan.

"KURARAY PVA 235" refers to a trade designation for a polyvinyl alcohol polymer commercially available from Kuraray Co. LTD, Japan.

"RESIMENE 730" refers to a trade designation for a methylated melamine formaldehyde resin commercially available from Ineos Melamines, Inc., Marietta, Ga.

"SNOWTEX ST-O-40" refers to a trade designation for an aqueous colloidal spherical silica dispersion with 40.8 weight percent solids (nominally 41% solids and average particle size of approximately 40 nm) obtained from Nissan Chemical Company, Pasadena, Tex.

"TEOS" was tetraethoxysilane obtained from Alfa Aesar, Ward Hill, Mass.

Test Methods

Method for Anti-Fog Test

In a 1000 milliliter (mL) covered beaker, 400 mL of water was heated to 80° C. The lid contained a circular cut opening of 4 centimeter (cm) diameter, which was covered with a metal plate. After removal of the plate, film samples from Examples and Comparative Examples described below were immediately placed over the opening with the coated side down. The degree of fogging observed on the film was recorded after 60 seconds. The degree of fogging was graded by assigning one of the following ratings: P=pass (the film remains completely transparent), SF=slight fail (water droplets reduce visibility through the film slightly), F=fail (significant loss of visibility through the film), or BF=big fail (the film is rendered opaque with fog).

Method for Wet Abrasion Test

The samples prepared from Examples and Comparative Examples described below and tested according to the method for anti-fog test were used. The samples were removed from the opening after 60 seconds of moisture exposure and the metal plate was replaced. The sample was immediately rubbed 5 times with a folded KIMWIPE tissue (commercially available from Kimberly-Clark Corporation, Neenah, Wis.). The degree of abrasion was graded on a scale of 1-5, with the grade assigned according to the following criteria: 1=big fail (layers of coating are easily wiped away), 2=fail (layers of coating wipe away only after multiple wipes), 3=slight fail (coating is scratched, but layers remain intact), 4=very slight fail (minimal scratching of the coating), and 5=pass (no visible damage).

Method for Abrasion Testing

A TABER 5155 rotary platform abrasion tester (obtained from Taber Industries of North Tonawanda, N.Y.) was fitted with a CS-10F Calibrase wheel (obtained from Taber Industries, North Tonawanda, N.Y.). The samples from Examples and Comparative Examples described below were abraded for 500 cycles with a load of 500 grams following ASTM D0460. Transmission and haze measurements were performed using a BYK-Garner Haze-Gard Plus (obtained from BYK-Gardner of Columbia, Md.) fitted with a Taber wheel sample holder.

Method for Oscillating Sand Testing

Samples prepared according to the Example and Comparative Example described below were die cut using a Circle Buttonmaker 1806761 (obtained from AccuCut, Omaha, Nebr.) and a die cutter (obtained from AccuCut, Omaha, Nebr.). The initial gloss, transmission and haze of the samples were measured using a Micro-Tri-Gloss 4528 gloss meter (obtained from BYK-Gardner of Columbia, Md., and a BYK-Garner Haze-Gard Plus (obtained from BYK-Gardner of Columbia, Md.). The sample was then placed in the lid of a Speedmixer cup (obtained from FlakTek Inc, Landrum, S.C.) with the uncoated side pressed against the lid. Sand (50 g, ASTM C-190 sand) was added to the testing container. Samples were placed in a shaker upside down (Shaker model 3500, obtained from VWR International, Radnor, Pa.) such that the sand was on top of the samples. The samples oscillated on the shaker for 60 minutes at 450 rpm. Upon completion, the samples were rinsed under a stream of deionized water for 10 seconds before drying with compressed air. If the samples appeared smudged, the samples were re-cleaned. The sample was then removed from the cup and the final gloss, transmission and haze data was collected.

Preparative Example 1 (PE 1)

A total of 3.8 kilograms (kg) of nano-silica coating solution with a solids content of 4.5 wt. % was prepared by mixing the following in the order listed: 349 grams (g) of NALCO DVSZN004 (40.8 wt. % silica in water), 67.9 g of SILCO LI-0830 (30.5% silica in water), 3.38 kg of deionized water, 5.14 g of POLYSTEP B-430S (29%), and 21.5 g of nitric acid (3.0 moles/liter (M)). The nitric acid was added slowly with stirring until the pH reached 2.5.

This solution was coated on a 50 μm-thick PET substrate on a pilot scale coating line using a slot fed die coating method. The solution flow rate was 14 mL/minute, the coating width was 8 inches (20.32 cm), and the line speed was 20 feet/minute (ft/min) (6.1 meter/minute (m/min)), giving a wet thickness of 11 μm (calculated dry thickness of 0.5 μm). After coating the web traveled a 10 ft (3 m) span in the room environment, and then passed through 20 ft (6.1 m) of air flotation ovens set at 120° C. The PET substrate was primed with a flash lamp treatment before the coating procedure to improve the adhesion of the silica to the PET substrate.

Examples 1-5 (E1-E4) and Comparative Example 1 (CE 1)

A 10 wt. % solution of PVA in water was prepared by heating a mixture of water and solid KURARAY R-2105 at 90° C. overnight. This solution was diluted to 5 wt. %, and then acidified to a pH of 2.5 with a 4.4 M solution of phosphoric acid. Separately, aqueous solutions of varying ratios of citric acid and boric acid at a total concentration of 10% by weight were prepared. The above KURARAY R-2105 solution was heated to 70° C., then the citric and boric acid solution was added dropwise with stirring. The resulting coating solutions were allowed to cool to room temperature before coating.

CE 1 was prepared by coating the acidified solution of KURARAY R-2105, without addition of citric and boric acid, on the silica-primed PET substrate of PE 1 using a #22 wire-round rod (obtained from BYK Instruments, Columbia, Md.). This gives a coating with an expected dry thickness of roughly 2 μm. The coating was dried by placing in an oven at 120° C. for 10 minutes.

E1-E5 were prepared by coating the above coating solutions containing the boric acid-citric acid mixtures on the silica-primed PET substrate of PE 1. The wt. % boric acid with respect to KURARAY R-2105 and the ratio of boric acid and citric acid in the coating solutions were varied as reported in Table 1, below. Similarly to CE 1, PVA solutions containing the boric acid-citric acid mixtures were coated using a #22 wire-round rod and dried and cured by placing in an oven at 120° C. for 10 minutes. The E1-E5 and CE 1 samples were then tested using the anti-fog and wet abrasion tests described above. Results are reported in Table 1, below.

TABLE 1

| Example | Wt. % boric acid relative to KURARAY R-2105 | Ratio of citric acid:boric acid | Anti-fog performance after 60 seconds | Wet abrasion performance |
|---|---|---|---|---|
| CE 1 | 0 | N/A | P | 1 |
| E1 | 5 | 3:1 | P | 1 |
| E2 | 5 | 1:1 | SF | 3 |
| E3 | 5 | 1:2 | SF | 3 |
| E4 | 10 | 1:1 | F | 3 |
| E5 | 10 | 1:2 | F | 3 |

N/A means not applicable

Examples 6-11 (E6-E11), and Comparative Examples 2-3 (CE 2-CE 3)

A 10 wt. % solution of KURARAY R-2105 in water was prepared by heating a mixture of water and solid KURARAY R-2105 at 90° C. overnight. This solution was diluted to 5 wt. %, and then acidified to a pH of 2.5 with a 4.4 M solution of phosphoric acid. Melamine-formaldehyde resin, RESIMENE 730, was diluted with water to a concentration of 10 wt. % solids. This diluted resin was then added to the KURARAY R-2105 solutions in varying amounts to prepare coating solutions.

E6-E8 were prepared by coating the above coating solutions containing the RESIMENE 730 on the silica-primed PET substrate of PE 1. The CE 2 sample did not contain any RESIMENE 730 in the coating solution. The wt. % RESIMENE 730 with respect to KURARAY R-2105 in the coating solutions were varied as reported in Table 2, below. Coating solutions containing the RESIMENE 730 were coated using a #22 wire-round rod (obtained from BYK Instruments, Columbia, Md.), giving a coating with an expected dry thickness of roughly 2 μm. The coatings were dried and cured by placing in an oven at 120° C. for 10 minutes. E9-E11 and CE 3 were prepared in the same manner as E6-E8 and CE 2, respectively, except that the KURARAY R-2105 was replaced with KURARAY PVA 235.

The E6-E11 and CE 2-3 samples were then tested using the anti-fog and wet abrasion tests described above. Results are reported in Table 2, below.

TABLE 2

| Example | PVA | Wt. % RESIMENE 730 relative to PVA | Initial anti-fog performance | Anti-fog performance after 30 seconds | Anti-fog performance after 60 seconds | Wet abrasion performance |
|---|---|---|---|---|---|---|
| CE 2 | R-2105 | 0 | P | P | P | 1 |
| 6 | R-2105 | 1 | SF | F | F | 2 |
| 7 | R-2105 | 5 | SF | F | F | 3 |
| 8 | R-2105 | 10 | SF | F | F | 5 |
| CE 3 | PVA 235 | 0 | P | P | P | 1 |
| 9 | PVA 235 | 1 | SF | F | F | 3 |
| 10 | PVA 235 | 5 | SF | F | F | 4 |
| 11 | PVA 235 | 10 | SF | F | F | 5 |

Example 12 (E12) and Comparative Example 4 (CE 4)

A 10 wt. % solution of KURARAY R-2105 in water was prepared by heating a mixture of water and solid KURARAY R-2105 at 90° C. overnight. This solution was diluted to 5 wt. %, and then acidified to a pH of 2.5 with a 4.4 M solution of phosphoric acid. Melamine-formaldehyde resin, RESIMENE 730, was diluted with water to a concentration of 10 wt. % solids. This diluted resin was then added to the KURARAY R-2105 solution so that the resulting coating solution had 10 wt. % RESIMENE 730 relative to KURARAY R-2105.

To 20 g of the above coating solution, 20 mg of POLYSTEP B-430S was added. This solution was coated with a #12 wire-round rod (obtained from BYK Instruments, Columbia, Md.) on either the silica-primed PET of PE 1 (to make E12 sample) or on a 100 µm-thick PET substrate (to make CE 4 sample). The E12 and CE 4 samples were allowed to air dry for 15 minutes, and were then cured in an oven at 120° C. for 2 minutes. The E12 and CE 4 samples were then tested using the anti-fog and wet abrasion tests. The results are reported in Table 3, below.

TABLE 3

| Example | Initial anti-fog performance | Anti-fog performance after 30 seconds | Anti-fog performance after 60 seconds | Wet abrasion performance |
|---|---|---|---|---|
| CE 4 | F | F | F | 1 |
| E12 | P | P | P | 5 |

Examples 13-14 (E13-E14) and Comparative Example 5 (CE 5)

A 10 wt. % solution of KURARAY R-2105 in water was prepared by heating a mixture of water and solid KURARAY R-2105 at 90° C. overnight. This solution was diluted to 5 wt. %, and then acidified to a pH of 2.5 with a 4.4 M solution of phosphoric acid. A vial was charged with 16 g of the 10 wt. % KURARAY R-2105 solution prepared above, 3.6 g of deionized water, 0.4 g of tetraethoxysilane (TEOS), and 27 mg of POLYSTEP B-430S solution (which was diluted to 2.9% solids in water). The suspension was acidified by addition of either citric acid (15% solution in water for E13) or nitric acid (3.0 M solution for E14) to a final pH of 2.5. The solution for CE 5 was prepared in the same manner as E14 except that it contained no TEOS. The resulting suspension was stirred for 6 hours, at which point it turned from cloudy to clear. Separately, a vial was charged with 2.68 g of colloidal silica (SNOWTEX ST-O-40), 8.32 g of water, and 15 mg of POLYSTEP B-430S solution (diluted to 2.9% solids in water). The solution was then acidified by addition of either citric (for E13) or nitric acid (for E14 and CE 5) to a pH of 2.5. To this solution 10 g of the above prepared KURARAY R-2105 solution containing TEOS and POLYSTEP B-430S was added with stirring to prepare the coating solutions.

Thus prepared coating solutions were coated on silica-primed PET of PE 1 using a #12 wire-round rod (obtained from BYK Instruments, Columbia, Md.), giving a coating with an expected dry thickness of roughly 2 µm. The coatings were allowed to air dry for 10 minutes, then dried and cured by placing in an oven at 80° C. for varying times as reported in Table 4, below. The E13, E14 and CE 5 samples were then tested using the anti-fog and wet abrasion tests. All samples passed the anti-fog test at all time points. The results of the wet abrasion test are reported in Table 4 below.

TABLE 4

| | | Wet Abrasion Test after | | | | |
|---|---|---|---|---|---|---|
| Example | Contains TEOS | 30 sec. oven time | 1 min. oven time | 2 min. oven time | 4 min. oven time | 10 min oven time |
| CE 5 | no | 1 | 1 | 1 | 2 | 2 |
| E13 | yes | 1 | 1 | 2 | 2 | 4 |
| E14 | yes | 1 | 3 | 3 | 4 | 5 |

While the specification has described in detail certain exemplary embodiments, it will be appreciated that those skilled in the art, upon attaining an understanding of the foregoing, may readily conceive of alterations to, variations of, and equivalents to these embodiments. Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. An article comprising:
   a. a substrate; and
   b. a multilayer coating attached to the substrate, the multilayer coating comprising
      i. an first crosslinked poly(vinyl alcohol) (PVA) layer that is an outermost layer of the multilayer coating; and
      ii. a first silica layer disposed between a surface of the substrate and the outermost crosslinked PVA layer, the first silica layer comprising a plurality of acid-sintered interconnected silica nanoparticles arranged to form a continuous three-dimensional porous network.

2. The article of claim 1, further comprising one or more second PVA layers disposed between the first crosslinked PVA layer and the first silica layer, between the first silica layer and the substrate, or a combination thereof.

3. The article of claim 2, wherein the second PVA layer comprises crosslinked PVA.

4. The article of claim 2, wherein the first crosslinked PVA layer, the second PVA layer, or both comprises a silane-modified PVA.

5. The article of claim 1, wherein the first silica layer further comprises PVA.

6. The article of claim 1, wherein the first crosslinked PVA layer further comprises a plurality of silica nanoparticles.

7. The article of claim 1, wherein the silica nanoparticles have a bi-modal size distribution.

8. The article of claim 7, wherein the silica nanoparticles have average particle diameters up to 20 nanometers.

9. The article of claim 1, wherein the plurality of acid-sintered interconnected silica nanoparticles are formed from a dispersion comprising the silica nanoparticles acidified with an acid having a pKa less than 3.5 to a pH in a range of 2 to 5.

10. The article of claim 1, further comprising one or more second silica layers disposed between the first silica layer and the first crosslinked PVA layer.

11. The article of claim 10, wherein the second silica layer comprises a plurality of acid-sintered interconnected silica nanoparticles arranged to form a continuous three-dimensional porous network.

12. The article of claim 11, wherein the second silica layer further comprises PVA.

13. A method of making an article, the method comprising:
 a. providing a substrate;
 b. attaching a multilayer coating to a surface of the substrate, the attaching comprising
  i. forming a first silica layer adjacent to the substrate, the first silica layer comprising a plurality of acid-sintered interconnected silica nanoparticles arranged to form a continuous three-dimensional porous network; and ii. forming a first crosslinked PVA layer, wherein the first crosslinked PVA layer is an outermost layer of the multilayer coating.

14. The method of claim 13, further comprising forming a second PVA layer, the second PVA layer disposed between the first silica layer and the first crosslinked PVA layer.

15. The method of claim 13, wherein the first crosslinked PVA layer further comprises a plurality of silica nanoparticles.

16. The method of claim 13, wherein forming the first silica layer comprises preparing a dispersion containing the silica nanoparticles acidified with an acid having a pKa less than 3.5 to a pH in a range of 2 to 5, coating the dispersion on the substrate, and drying the coating to form the plurality of acid-sintered silica nanoparticles.

17. The method of claim 13, wherein the first silica layer further comprises PVA.

18. The method of claim 13, wherein the first crosslinked PVA layer comprises a silane-modified PVA.

* * * * *